June 10, 1930. P. KANE 1,762,395
CLUTCH CONTROL LEVER FOR REAPERS
Filed Oct. 25, 1928 3 Sheets-Sheet 1

Inventor
Paul Kane
By [signature]
Atty.

June 10, 1930.  P. KANE  1,762,395
CLUTCH CONTROL LEVER FOR REAPERS
Filed Oct. 25, 1928  3 Sheets-Sheet 3
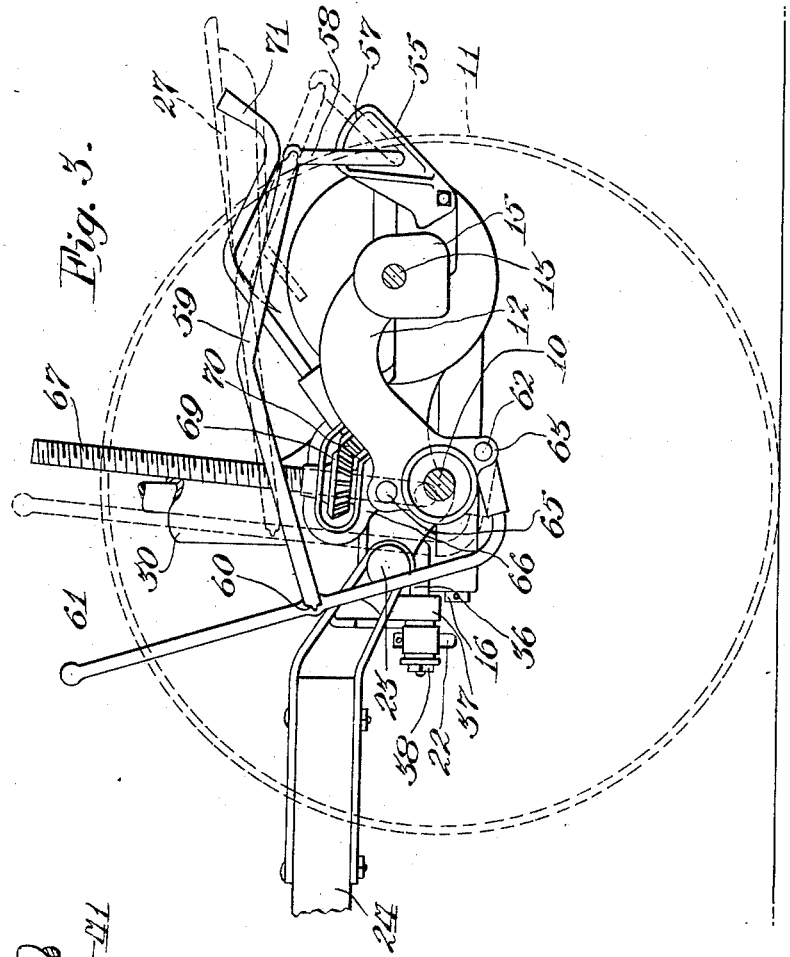
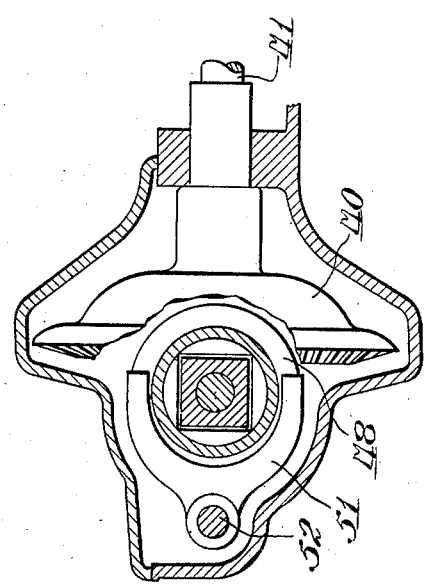
Inventor
Paul Kane
By
Atty.

Patented June 10, 1930

1,762,395

UNITED STATES PATENT OFFICE

PAUL KANE, OF NEUSS, GERMANY, ASSIGNOR TO INTERNATIONAL HARVESTER COMPANY, A CORPORATION OF NEW JERSEY

CLUTCH-CONTROL LEVER FOR REAPERS

Application filed October 25, 1928, Serial No. 314,953, and in Germany January 6, 1928.

This invention relates to reapers.

These machines as well known in the art include a sickle and a raking mechanism which are driven from a suitable source of power, such for example as the main carrying wheel, which also supports the frame of the reaper. The driving connections from this main carrying wheel, of course, include a clutch, which functions through an operator controlled lever mechanism, to make and break the drive for the sickle and rake mechanism, as obviously there are times when it is not desired to drive these parts. This clutch control mechanism embodies a hand lever carried on the reaper in a position proximate to the operator's station on his seat carried on the reaper.

It is also known in these machines that the main frame thereof must be raised or dropped to adjust the height of cut for the sickle relatively to the ground. It has been found that when such adjustments are made in reapers as now known and used, the clutch control lever shifts its position to such an extent that at times it no longer is conveniently accessible to the operator from his seat. In fact, it has been found that this lever at times assumes a position so close to the revolving rake structure that the operator positively endangers himself in attempting to actuate the lever.

With this problem stated, it is the main object of this invention to provide an improved mounting for the clutch controlling lever so that when vertical adjustments of the main frame are effected for raising or lowering the sickle, the said clutch controlling lever will maintain itself in a substantialy fixed position, regardless of the up or down position of the sickle and the main frame.

Another object is generally to improve the construction of a reaper, as will subsequently appear.

Briefly, these desirable objects are accomplished in a reaper embodying a main carrying and driving wheel, to which is pivotally connected, through the intermediary of a yoke, the main frame by which the sickle is carried. Driving connections are provided on the main frame connected to the main wheel for driving the sickle, and there also is the usual revolving rake structure carried on the main frame. A clutch is interposed in the driving connections for starting and stopping the sickle and rake structure. A hand control lever is mounted in a novel manner on the yoke mentioned, so that it will at all times be accessible and within convenient reach of an operator located on a seat provided on the reaper. The clutch control mounted on this yoke is such, due to a novel link arrangement, that when vertical adjustments of the main frame are effected, the lever does not substantially alter its location relative to the operator's seat. As will later appear, the movement of this lever is very much like the movement of one side of a parallelogram, so that this clutch control lever, which may represent one side of a parallelogram, moves but slightly and with a translational movement in substantially parallel lines.

The invention is illustrated in the accompanying sheets of drawings, in which:

Figure 1 is a general plan view of so much of a conventional reaper as is necessary to illustrate the improvements of this invention in combination therewith;

Figure 2 is a side elevational view showing in full lines the position assumed by the main frame, yoke, and clutch control lever when the sickle is in its lowermost position. This view also illustrates in dotted lines the position assumed by the clutch control lever when the frame and sickle are in their highest position of adjustment. It can be seen that the clutch control lever but very slightly alters its position throughout the range of adjustment for the main frame and sickle;

Figure 3 is a similar side elevational view showing the position of the parts when the sickle and main frame are in their uppermost adjusted position. In the dotted lines in this figure is shown the position of the clutch lever when it is locked in its detent notch, as when the clutch has been disconnected;

Figure 4 is a sectional, detail view of the clutch as viewed along the lines 4—4 of Figure 1, when looking in the direction of the arrows; and Figure 5 is another sectional view of the clutch parts as viewed along the line 5—5, as seen in the direction of the arrows shown in Figure 1.

Figure 1:
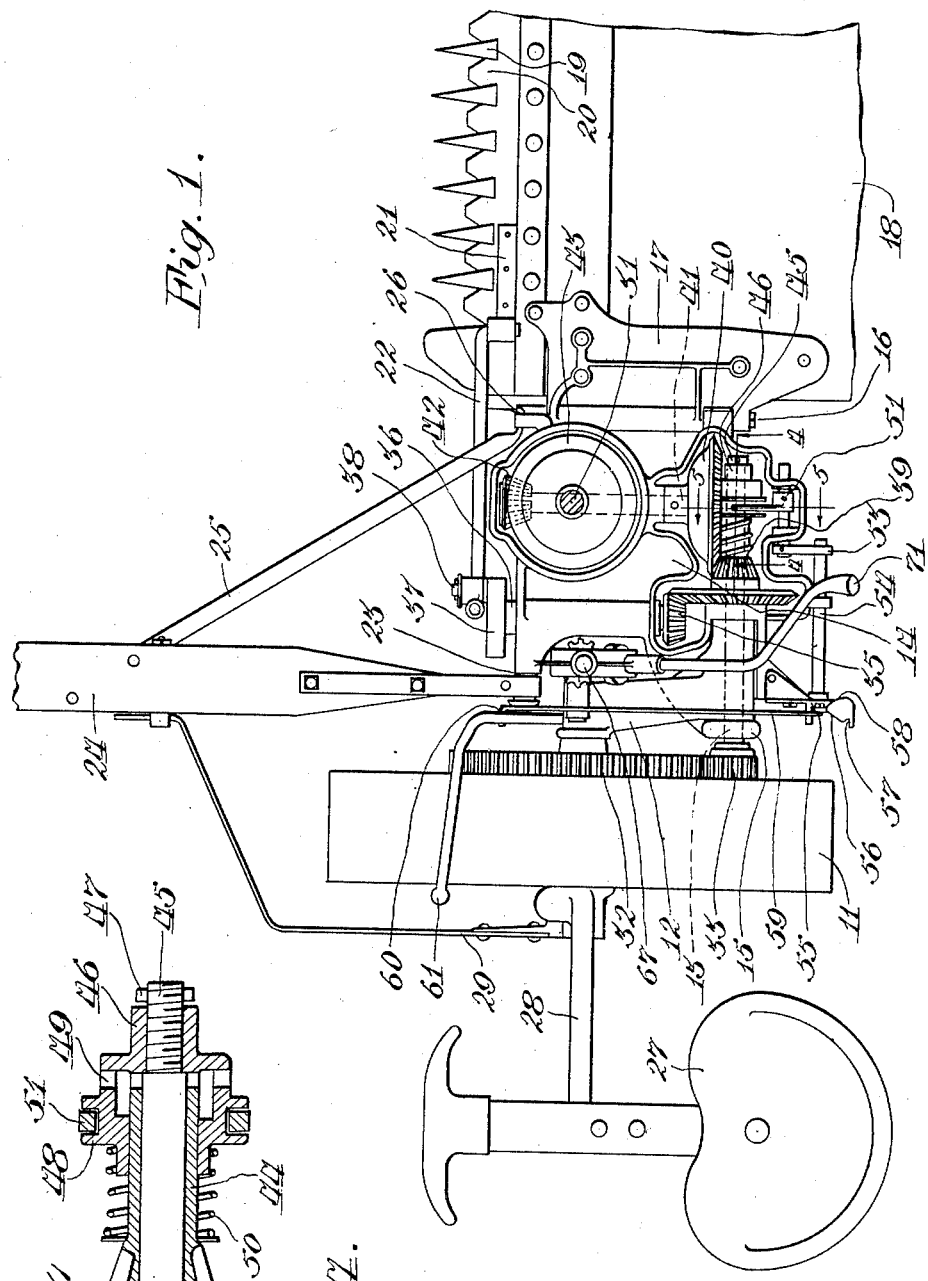

It will be understood that the reaper herein shown is standard and conventional in most respects and that it includes a main axle 10 on which is carried a main wheel 11. This main wheel axle 10 pivotally carries a rearwardly extending yoke 12 which is connected, through the intermediary of a transverse stub shaft 13, to a main frame casting 14 by means of ears 15 in which the stub shaft 13 is journaled, as best shown in Figure 1. The connection of the yoke 12 to the shaft 13 is a pivotal one. The grainward end of the main frame is provided with the usual longitudinal pivot pin 16 for pivotally carrying a coupling casting 17, which casting in turn rigidly carries the platform 18 of the reaper. It will be understood that the extreme grainward end of this platform, which has not been shown, is conventionally supported and carried on a grain wheel, not shown.

The forward end of the platform 18 is provided with guard fingers 19 between which operates a reciprocatory knife or sickle 20 provided at its stubbleward end with the usual knife head 21 operable by a reciprocatory pitman 22, the driving connections for which will later be described. Pivotally connected to the main frame at 23 is the usual forwardly extending draft tongue 24 braced by a diagonal brace 25 to the main frame at 26. The reaper is provided in a conventional manner with an operator's seat 27, the support 28 of which is further strengthened by a brace 29, as shown. The driving connections from the main carrying wheel 11 will next be described, but first we shall deviate to say that the main frame 14 also carries a vertical post 30 in which is arranged the usual rake driving shaft 31, which carries the revolving rake structure conventional in these machines and, therefore, not shown, it being understood that these rakes revolve and sweep the platform 18 to gather the material cut by the sickle.

The main wheel 11 in any conventional manner has carried thereon to rotate therewith, a large spur gear 32 geared to a small pinion 33 made fast on the stubbleward end of the shaft 13. In this manner the shaft 13 derives its rotation from the main wheel 11 as the machine travels along. The shaft 13 furthermore carries a large bevel gear 34 in mesh with a bevel pinion 35, which drives a shaft extending forwardly and longitudinally, indicated by the numeral 36, the forward end of said shaft carrying a flywheel 37, on which is an eccentric pin connection 38 connected to drive and reciprocate the pitman 22 and, as a result, the knife or sickle 20.

Rotating with the gear 34 is a bevel gear 39, which is in mesh with and drives a large bevel gear 40 arranged on a shaft 41 extending longitudinally forwardly of said shaft and carrying at its front end a small bevel pinion 42 which in turn drives a large horizontally arranged bevel gear wheel 43 made fast on the lower end of the vertical shaft 31. In this manner, the rake structure, not shown, which is mounted on the shaft 31, receives its revolving motion.

The large bevel gear 34 and the small bevel gear 39 are integral and both are loosely mounted on the shaft 13, the gear structure including a sleeve 44, (see Figures 1 and 4), which sleeve and gear structure is loose on said shaft 13. Threadedly connected to the end of the shaft at 45 is made fast a clutch part 46, which is prevented from accidental displacement from the shaft by means of a pin 47. A loose and slidable clutch part 48 is arranged on the sleeve 44, and it will be seen that the opposing faces of the clutch parts 46 and 48 are provided with a conventional form of interlocking clutch teeth 49. A spring 50 encircling the parts normally exerts a force to hold the loose clutch part 48 into driving engagement with the fast or constantly rotating clutch part 46, so that the shaft 13 is normally driven. A clutch shipper fork 51 is provided for disconnecting the clutch part. This clutch control mechanism will now be described.

The shipper fork 51 is made fast to a transverse stub shaft 52, which is slidably arranged in bearings, as best shown in Figure 1, in a rear part of the main frame, said shaft 52 being connected by a member 53 to another transverse shaft 54, which is rockably and slidably mounted in a bracket 55, said bracket being formed with a cam surface 56 and a detent notch 57 at its back end. A crank 58 extends upwardly from the shaft 54 and is connected at its upper end to a forwardly extending link 59 pivotally connected at 60 to a hand control lever 61, which lever at its lower end is pivotally fulcrumed at 62 to a boss 63 formed integrally on the yoke 12 and in close location to the axle 10. It is to be noted that this hand lever 61, as shown in Figure 1, is curved outwardly in the direction of the operator's seat 27 so as to be conveniently accessible to the operator.

If it is desired to throw out the clutch and stop the operation of the sickle and the revolving rake structure, the operator grasps the lever 61, moving it back to the dotted line position shown in Figure 3, and this results in the rocking of the crank 58 backward through the medium of the link 59, which results in said crank 58 riding along the cam surface 56, which will pull or slide the shaft 54 to the left, as seen in Figure 1, or in a stubbleward direction. Movement of the shaft 54 to the left also carries the shaft 52 with it, and this results in moving the shipper fork 51 also to the left, as said fork is made fast on said shaft 52, and, as a result, the clutch part 48 will be disconnected from clutch part 46 against the pressure of the spring 50. When the crank 58 is moved back far enough along the cam surface 56, it will seat itself and lock in the detent notch 57, thereby holding the clutch in disconnected position against the action of the spring 50, as will be understood.

As has been briefly stated, it is necessary in meeting varying conditions that the sickle be raised or lowered to vary the height of cut. This is accomplished by raising or lowering the main frame through the yoke 12, which carries the main frame on the axle 10. Looking to the drawings, it will be seen that the yoke 12, substantially diagonally opposite the pivot 62, carries another boss 64, and to this boss 64 is pivoted at 65 a bracket 66 in which is rotatably threaded a screw 67, the lower end of which is pivoted at 68 to the main frame (see Figure 2).

Figure 2:
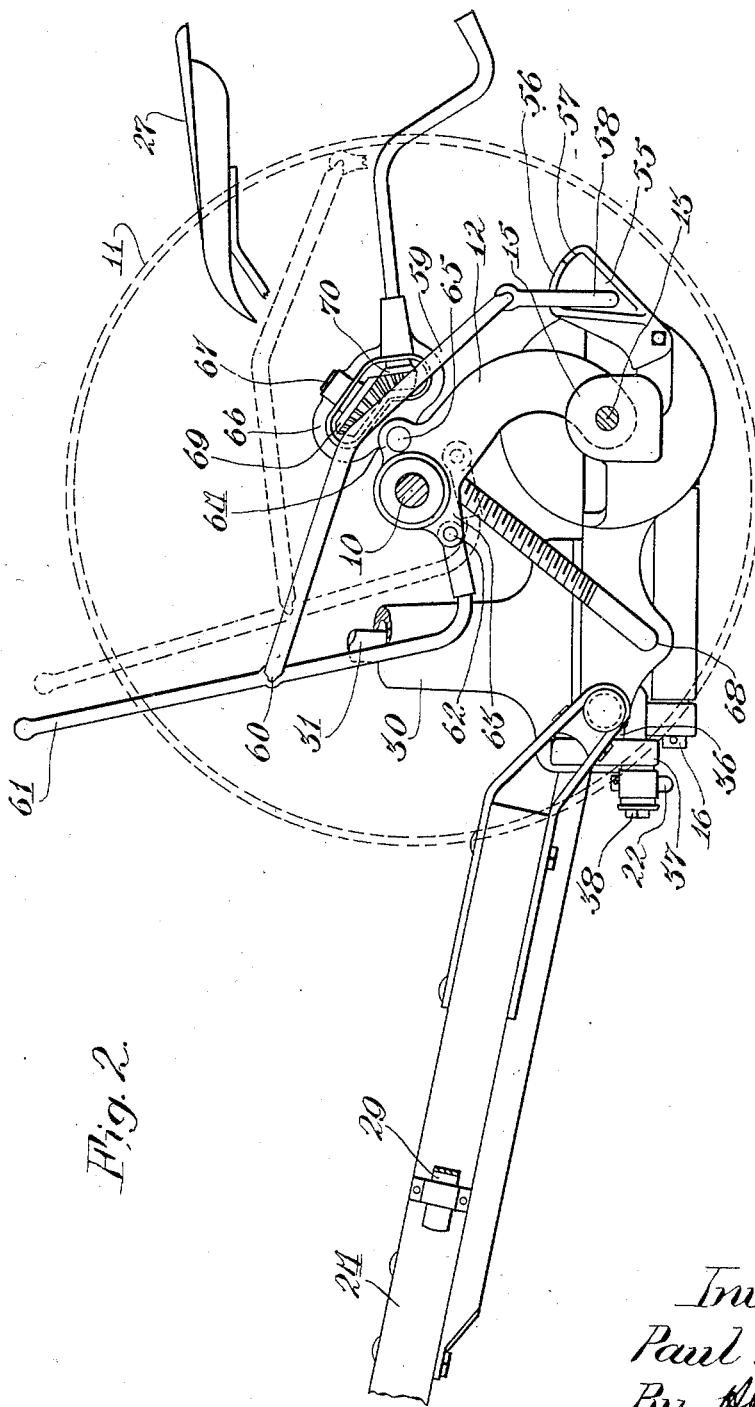

This threaded shaft carries within the bracket 66 a threaded bevel pinion 69 in mesh with a bevel gear 70 carried at the end of an adjusting crank 71 journaled in the bracket 66, as shown in said Figure 2. The operator in adjusting the main frame and sickle up or down grasps the crank 71 and, rotating it in the proper direction, causes the gears 69 and 70 to rotate, and, as a result, the threaded shaft 67 will move up or down with a screw action and, as said threaded shaft 67 is directly connected to the main frame at 68, it necessarily must pull up or push down on said frame and carry with the main frame all parts connected thereto, such for example as the sickle. In this manner, the sickle is vertically adjusted for height relative to the ground. It will be seen that this raising action of the main frame, or the lowering action, as the case may be, is accomplished by the push or pull of the screw shaft 67 on the yoke 12, which will swing around an axis on the axle 10.

In conventional reapers, when this adjustment of the main frame and sickle are made in this manner, the clutch control lever 61 would frequently assume positions out of reach of the operator and, in fact, sometimes this lever would assume a position so close to the revolving rake structure that it would be very dangerous for the operator to attempt to reach the lever. In the present machine, the lever, regardless of the position of the main frame up or down, is retained in substantially the same position at all times, it moving but slightly, as indicated in Figure 2, due to the fact that it is pivotally mounted on the yoke 12 at a point only very slightly removed from the axis of turning movement of the yoke 12. The connecting link 59 also is so arranged that the action of the lever 61 when it shifts is very much like the movement of one side of a parallelogram. By this, it is meant that the link 59 controls the movement of the lever 61 in its slight shift to such an extent that the movement of the lever is substantially one of translation in parallel lines. Thus, at all times, the operating handle 61 is closely accessible to the operator on his seat and can never assume a position out of reach of the operator nor one in dangerous proximity to the revolving rake structure.

With this description, it can now be seen that an improved mounting for the clutch control lever of a reaper has been provided, which structure accomplishes all of the desirable objects heretofore recited.

What is claimed as new is:

1. A reaper having an axle, a yoke pivoted thereto, a main frame pivotally connected to the yoke, a sickle carried by the main frame, driving connections for the sickle, a clutch included in said driving connections, and a lever fulcrumed on said yoke for controlling the clutch.

2. Like claim 1 but characterized further by the fact that said lever is pivoted to said yoke at a point closely adjacent the axle.

3. A reaper having a main wheel, an axle therein, a yoke pivoted to the axle, a main frame pivotally connected to the yoke, driving connections for the sickle, a clutch included in said driving connections, means on the yoke for pivoting the yoke to raise or lower the main frame and sickle relative to the ground, and a clutch control lever fulcrumed on the said yoke at a point closely adjacent the axle whereby said lever cannot substantially alter its position when the frame and sickle are so lowered or raised.

4. Like claim 3 but characterized further by the fact that an operator's seat is provided on the reaper and in which the lever does not substantially alter its position relative to said seat when the frame and sickle are so adjusted.

5. A reaper having a main wheel, an axle therein, a yoke pivoted to the axle, a main frame pivotally connected to the yoke, a sickle connected to the main frame, driving connections for the sickle, a clutch included in said driving connections, means for pivoting the yoke to raise or lower the main frame and sickle relative to the ground, a clutch control lever fulcrumed on said yoke at a point closely adjacent the axle, and a link connection between the said lever and clutch, the movement of the lever due to said link being translational in substantially parallel lines without materially altering the position of said lever during such changes in the up or down position of the main frame.

In testimony whereof I affix my signature.

PAUL KANE.